(12) United States Patent
Anderson (10) Patent No.: US 6,487,486 B1
(45) Date of Patent: Nov. 26, 2002

(54) AUTOMATIC DIFFERENTIAL CONTROL LOGIC

(75) Inventor: Donald D Anderson, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/930,526

(22) Filed: Aug. 14, 2001

(51) Int. Cl.$^7$ .................................................. G06F 7/00
(52) U.S. Cl. ............................. 701/69; 701/89; 701/87
(58) Field of Search .......................... 701/69, 89, 82, 701/84, 86, 87, 90; 180/197

(56) References Cited

U.S. PATENT DOCUMENTS

| | | |
|---|---|---|
| 4,841,804 A | 6/1989 | Miura et al. |
| 4,886,140 A | 12/1989 | Leiber et al. |
| 4,982,807 A | 1/1991 | Hilburger et al. |
| 4,984,649 A | 1/1991 | Leiber et al. |
| 5,019,021 A | 5/1991 | Janson |
| 5,071,392 A | 12/1991 | Stall et al. |
| 5,103,928 A | 4/1992 | Danner et al. |
| 5,220,975 A | 6/1993 | Zimmer et al. |
| 5,243,527 A | 9/1993 | Kroger |
| 5,357,434 A | 10/1994 | Zimmer et al. |
| 5,597,215 A | 1/1997 | Fischle et al. |
| 5,631,829 A * | 5/1997 | Takasaki et al. .............. 701/89 |
| 5,989,147 A | 11/1999 | Forrest et al. |

* cited by examiner

Primary Examiner—Richard M. Camby
(74) Attorney, Agent, or Firm—Mark P. Calcaterra (57) ABSTRACT

A process for continuously controlling the transfer of torque within a differential where a target delta ($\Delta_T$) value is determined as a function of a first differential output shaft speed ($\omega_a$) and a second differential output shaft speed ($\omega_b$) and then normalized according to the vehicle speed when the vehicle is being driven under a no wheel slip condition. A normalized actual delta ($\Delta_A$) is also determined as a function of the first output shaft speed ($\omega_a$) and the second output shaft speed ($\omega_b$), a comparison is made between $\Delta_T$ and $\Delta_A$ and torque is transferred between the first and second output shafts of the differential according to a logic control methodology such as proportional, integral, and/or derivative (PID) control methodologies if the comparison result of $\Delta_A$ to $\Delta_T$ is outside of a tolerance range established around $\Delta_T$.

20 Claims, 4 Drawing Sheets

| 58a | 72 | 74 | 76 |
|---|---|---|---|
| A | ΔF | ΔR | ΔC |
| 0° | 0 | 0 | 0 |
| 1° | B | C | D |
| 2° | E | F | G |
| 3° | H | I | J |
| 4° | K | L | M |

AUTOMATIC DIFFERENTIAL CONTROL LOGIC

FIELD OF THE INVENTION

The present invention relates generally to a method of controlling a differential, and more specifically, to a method of automatically controlling the transfer of torque within a motor vehicle differential by monitoring the speeds of differential output shafts and comparing those speeds to a normalized target value and subsequently using specific combinations of proportional, integral and derivative (PID) control logic to transfer torque to the necessary output shaft of the differential.

BACKGROUND OF THE INVENTION

Four-wheel-drive systems for the automotive, pickup truck and sport utility vehicle markets utilize a variety of mechanical, electrical and electronic systems to engage and control the driving wheels when a four-wheel-drive system activates and applies torque to a desired wheel. The amount or quantity of torque that an equipped four-wheel-drive system is capable of supplying and the time within which the system is capable of supplying or transferring torque depends upon the design of a particular four-wheel-drive system and its method of control.

Several major categories of four-wheel-drive systems are employed in vehicles. One such system consists of a permanent or full-time four-wheel-drive system. This system has no two-wheel-drive mode. Vehicles with permanent four-wheel-drive typically have a locking center differential which may split torque to the front and rear drive shafts. Electronics may or may not be employed to lock the differential to transfer torque to the front or rear driveshaft and ultimately the front or rear axle. Driving with the center differential locked makes steering more difficult or strenuous because the vehicle will tend to travel directly forward, and resist turning, especially on dry or compacted surfaces. When the center differential is open (not locked), it does not make any torque adjustments between the front and rear driveshafts.

Another type of four-wheel-drive system is on-demand four-wheel-drive. The major difference between permanent four-wheel-drive and on-demand four-wheel drive is the lack of a center differential on an on-demand system. In on-demand systems, either the front or rear axle receives all of the torque for everyday driving. Torque is transferred to the non-slipping axle when necessary, if the vehicle is so equipped. However, in most on-demand systems there is generally no way to turn off the four-wheel-drive, and likewise, the driver does not have to activate the system.

Part-time four-wheel-drive is yet another type of, four-wheel-drive system. This type of system provides torque to all four wheels upon engagement of the system by the driver. A vehicle equipped with part-time four-wheel-drive generally has an axle that receives all of the torque when the system is disengaged. A transfer case is employed to provide simultaneous torque to the front and rear axles when the system is engaged, including the normally non-driven axle, typically the front axle in many vehicles. However, there is no center differential to regulate torque between the front and rear driveshafts. Upon engagement, the front and rear axles are generally synchronized and rotate at the same speed, which improves straight line traction but makes turning the vehicle more difficult than if the speeds of the front and rear driveshafts could be altered. Because of this design, there is no way for the two axles to rotate at different speeds, in a cornering situation, for instance. Therefore, vehicle operation on loose or forgiving surfaces is necessary to permit wheel slip which helps to prevent damage to driveline components which could occur if the system is engaged and operated on dry pavement. If the vehicle is driven on dry pavement with the four-wheel-drive system activated, vehicle occupants will likely feel an awkward, vibrating rumble as a corner is turned, or even when straight line driving is attempted due to wheel speed mismatch. This vibration is caused by binding within the driveline system and may indicate impending driveline damage.

Drawbacks of the part-time four-wheel-drive system are the omission of a center differential thereby committing the front and rear axles to a matched speed and provokes the possibility of damage when the system is operated on dry pavement. Additional drawbacks of this type of system are that vehicle operators may be required to stop the vehicle to engage or disengage the system and to make the initial decision of whether road conditions warrant engaging the four-wheel-drive system. Varying road conditions may present a particular problem to drivers when deciding to engage and disengage a system. Requiring the driver to make this decision is yet another drawback of the part-time four-wheel-drive system.

Ultimately, there are automatic four-wheel-drive systems. These systems automatically determine when four-wheel-drive is necessary and transfer, as requirements necessitate, torque to the wheel(s) with the most traction, or rather, to the wheels with the least amount of wheel slip. This system requires a limited slip center differential or similar type of viscous coupling or multi-plate clutch, in a transfer case, a front and rear driveshaft, and a limited slip differential in each axle. The benefit of an automatic four-wheel-drive system is that it senses its own traction needs as the vehicle travels over any terrain, and then continuously adjusts for wheel slippage or lack of traction. This permits the driver to concentrate on driving instead of having to concern himself or herself with shifting the vehicle into or out of four-wheel-drive. However, a drawback of the automatic four-wheel-drive system is that a driver's efforts may be hampered in severe off-road conditions. That is, because the system constantly monitors wheel slip according to the terrain, a driver may find the torque adjustment from one wheel or axle to another to be abrupt and unsettling while the vehicle negotiates such terrain. This may be especially true if the four-wheel-drive system senses a need for a torque adjustment and then lags in invoking that adjustment, causing an abrupt and unsettling shift in torque, regardless of the degree of that unsettling shift. As the speed of the torque adjustment upon wheel slip increases, the abruptness of the shift will decrease.

The above four-wheel-drive systems are all capable of providing four-wheel-drive capability in some capacity, whether it be full-time, on-demand, part-time or automatic. The automatic four-wheel-drive systems base the engagement of the system upon a change in a measurable variable. However, what all current four-wheel-drive systems lack is a method of controlling wheel slip through the utilization of a measurable variable that takes into consideration the output shaft speeds of a differential but that is also normalized with respect to vehicle speed.

What is needed then is a method of controlling the torque through a differential that does not suffer from the above four-wheel-drive system limitations. Furthermore, what is needed then is an automatic four-wheel-drive system that utilizes a method of controlling wheel slip through the invocation of a calculated target differential ratio that considers the difference between the output shaft speeds of a differential but that also normalizes the difference with respect to vehicle speed and which then continually bases torque requirements on the comparison of the actual differential ratio to the normalized target differential ratio.

SUMMARY OF THE INVENTION

In accordance with the teachings of the present invention, an automatic four-wheel-drive system is disclosed which utilizes automatic differential control logic. The invention provides a logic based system that will compare the actual difference ($\Delta_A$) between a given differential's output shaft speeds to an acceptable range about a target difference ($\Delta_T$) between the differential output shaft speeds and determine, for a given differential, whether a torque bias is needed in order to decrease or prevent wheel slip from occurring.

In one preferred embodiment, the automatic differential control logic utilizes a method of logic-based control. Multiple methods of, logic based control may be adapted to the system, however, three primary methods of logic-based control are exemplified for this invention; proportional, integral, and derivative (PID) control methods. Each method of control utilizes a delta target ($\Delta_T$) value and a delta actual ($\Delta_A$) value. Both, $\Delta_T$ and $\Delta_A$ values are calculated using the speeds of the given output shafts, ($\omega_a$ and $\omega_b$, for a given differential.

The equation to arrive at a $\Delta_T$ value for a given differential is:

$$\Delta_T = (\omega_a - \omega_b)/(\omega_a + \omega_b)$$

where:

$\Delta_T$ = target value for a given differential $\omega_a$ = speed of a first differential output shaft $\omega_b$ = speed of a second differential output shaft The equation to arrive at a $\Delta_A$ value for a given differential is:

$$\Delta_A = (\omega_a - \omega_b)/(\omega_a + \omega_b)$$

where:

$\Delta_A$ = actual value for a given differential $\omega_1$ = speed of a first differential output shaft $\omega_b$ = speed of a second differential output shaft The $\Delta_T$ value is measured on a vehicle operating under a condition of no wheel slip. Therefore, for a vehicle traveling in a straight line on a hard or compacted surface with adequate traction, the measured $\Delta_T$ value will theoretically be zero and be constant. However, due to constant,:but minimal variations in steering wheel angle, disproportionate tire tread wear, disproportionate tire pressure, actual tire size, and minor variations in the road surface, the $\Delta_T$ value may actually not be zero. The non-zero $\Delta_T$ value becomes the $\Delta_T$ value for the given road surface and vehicle operating under a no-slip condition. To account for any real-world variations, an acceptable tolerance range exists around the $\Delta_T$ value. For instance, if the $\Delta_T$ is 10, and the acceptable tolerance is +/–0.5, then a value of 10.3 falls within the tolerance range and no torque adjustment results. In other words, a value of 10.3 is considered to be a no-slip wheel situation and no torque control or adjustment results.

The $\Delta_A$ value is arrived at by the same equation but is measured during every logic loop during actual, real world, vehicle operation. The $\Delta_A$ value is then compared to the $\Delta_T$ value. The absolute value of the difference between the $\Delta_T$ and the $\Delta_A$ value is known as the control value (CV) which a logic controller uses for torque correction and adjustment. The goal being to adjust the $\Delta_A$ value to that of the $\Delta_T$ by the amount of the CV to achieve the optimum condition of no wheel slip.

The proportional method of control utilizes the term:

$$(\Delta_A - \Delta_T)$$

and provides for a basic correction proportional to the calculated difference. Once again, a tolerance range must be provided around the $\Delta_T$ to provide for normal variation about the mean.

The integral method of control utilizes the term:

$$\sum_{i=1}^{n}(\Delta_A - \Delta_T)_i$$

and makes corrections based on the accumulated error over time. This provides for an accelerated response in the event that the error is not responding to repeated proportional control logic corrections.

The final method of control logic is the derivative method of control which utilizes the term:

$$(\Delta_A - \Delta_T)_{i+1} - (\Delta_A - \Delta_T)_i$$

and makes corrections based on the rate of change of the error. This provides for aggressive correction when the error is increasing as opposed to when the error is decreasing or maintained at a constant level.

The present invention provides for the utilization of a logic control method such as the proportional, integral and derivative methods of logic control either individually or in particular combinations as the four-wheel-drive system operates in automatic mode. However, the vehicle operator has the ability to disengage the system from automatic mode and place the system in an "off" or a "lock" mode. The "off" mode is utilized when the operator desires to permanently disengage the differential control system such as when a smaller diameter spare tire is installed on the vehicle. In this example, the system is prevented from continuously attempting to adjust for the smaller diameter tire. If not disabled, the system will continually attempt to adjust for the smaller tire because of different output shaft speeds, $\omega_a$ and $\omega_b$, respectively, across a differential, which normally indicate wheel slip. Alternatively, the four-wheel-drive system offers a "lock" mode to prevent any differentiation which provides maximum traction for off-road use.

To control the output shafts of each differential, regardless of the control logic methodology, clutch packs engage and disengage. The engagement and disengagement is accomplished using a hydraulic system(s) or electric motor(s) acting on the clutch packs within each differential. Since actuation speed of the four-wheel-drive system assists the driver in maintaining control over a given terrain, the selected method, hydraulic or electric, is an important consideration when selecting the PID or other logic combinations or method of control of the system.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
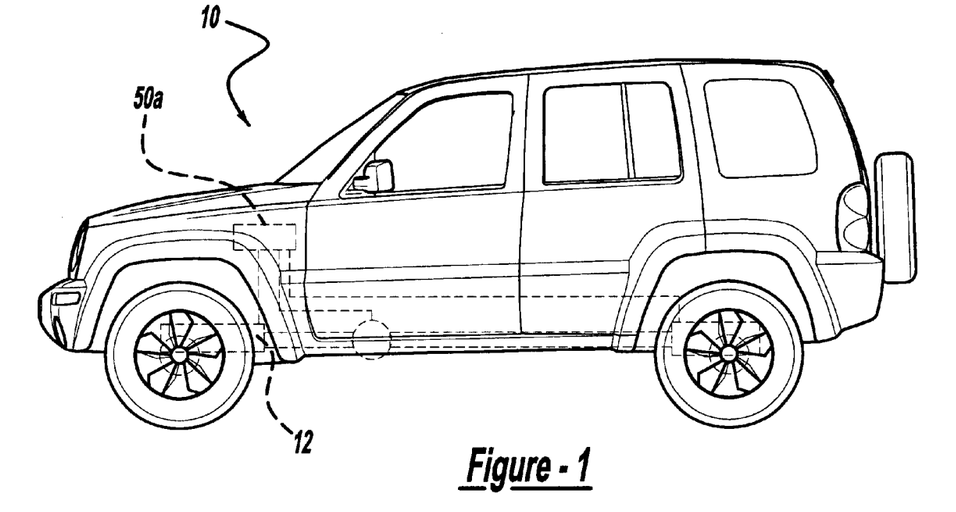
FIG. 1 is a perspective view of a vehicle having a four-wheel-drive system that is constructed in accordance with the teachings of the present invention.
Figure 2:
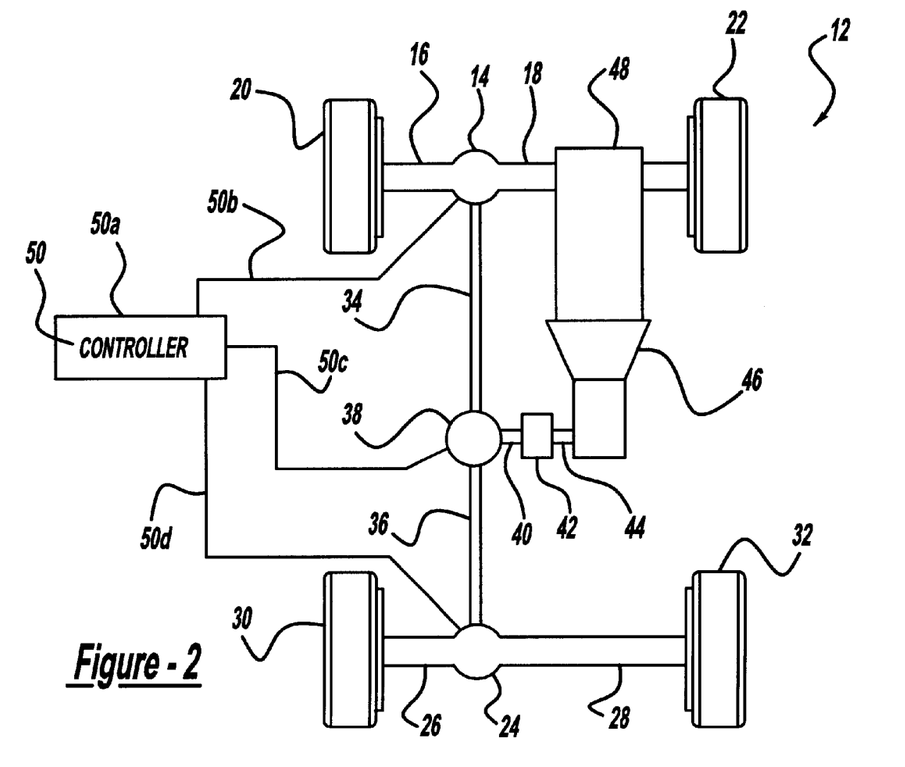
FIG. 2 is a top view of a portion of the vehicle: of FIG. 1 showing the major driveline components of a four-wheel-drive system.

With reference to FIG. 1 of the drawings, a vehicle 10 is shown in accordance with the present invention with the vehicle chassis 12 shown as hidden lines and logic box 50a also shown as hidden lines. FIG. 2 is a top view of the vehicle chassis 12 with major driveline components and automatic differential control logic system 50 (ADCLS) shown. The automobile chassis 12 includes a front differential 14, a left front output shaft 16, a right front output shaft 18, left front wheel 20, right front wheel 22, a rear differential 24, a left rear output shaft 26, a right rear output shaft 28, a left rear wheel 30, and a right rear wheel 32. Additionally, the front differential 14 and rear differential 24 are driven by a front drive shaft 34 and a rear drive shaft 36, respectively, each driven through a center differential 38. The center differential 38 has a center differential input shaft 40 for receiving rotary power from a transfer case 42. The transfer case 42 conventionally includes a transfer case input shaft 44 configured to receive rotary power produced by an engine 48 and transmitted through a transmission 46.

Figure 2A:
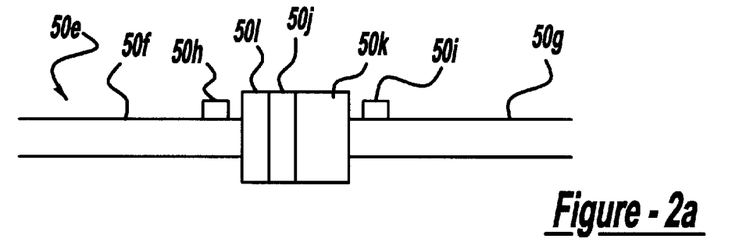
FIG. 2a is a top view of a portion of FIG. 2 showing a differential with a clutch pack and an electric or hydraulic actuator.

The major hardware components of the controller or ADCLS 50 consist of a logic box 50a, differential control wires 50b, 50c, and 50d to control front differential 14, center differential 38 and the rear differential 24, respectively. Referencing FIG. 2a and continuing the ADCLS 50 description, a representative internal differential system 50e is shown. Internal differential system 50e shows a first output shaft 50f, second output shaft 50g, a first speed sensor 50h, second speed sensor 50i, a clutch pack 50j and a differential 50k. A clutch actuator 50l acts upon the clutch pack 50j.

Figure 3:
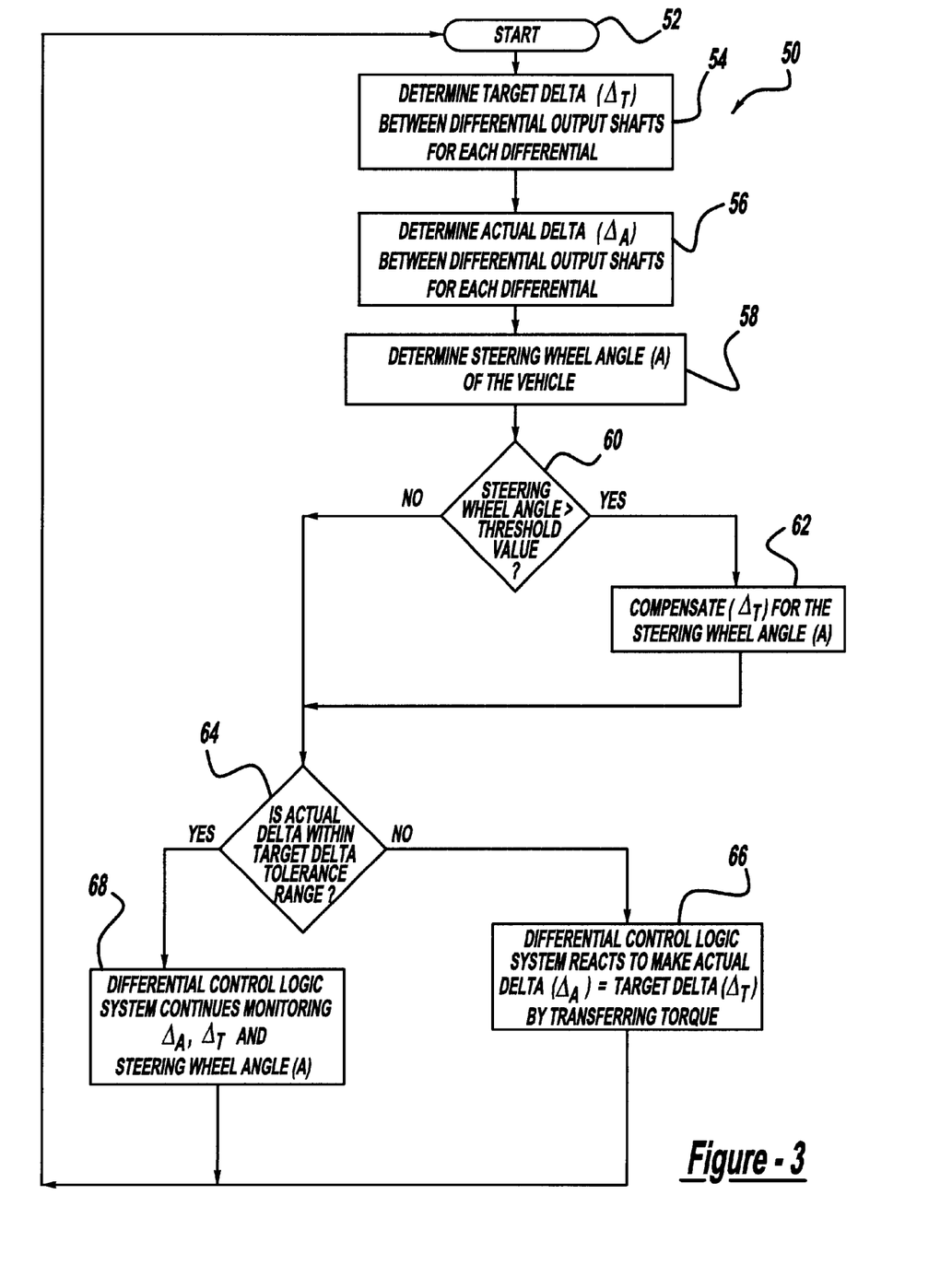
FIG. 3 is a flow chart depicting the operation of the automatic differential control logic system in accordance with the methodology of the present invention.

With additional reference to FIG. 3, the control logic and mechanical actuation of components associated with the ADCLS 50 of the present invention will be described in greater detail. While the vehicle 10 is operating on a surface that provides sufficient traction to prevent wheel slip, the ADCLS 50 measures and monitors specific target and actual values. Alternatively, the ADCLS 50 may utilize specific target values that are stored in logic memory if the terrain the vehicle is traversing warrants the utilization of such. Target values from memory may be employed if the vehicle is operating on a surface that causes the wheels to continually slip. The methodology employed by the ADCLS 50 is illustrated in FIG. 3 as a continuous logic loop without a specific starting and ending point, and that because of the nearly instantaneous looping (less than 60 microseconds), the monitoring of values may begin at any point within the loop when the vehicle 10 begins motion. Those skilled in the art, however, will also understand that the methodology employed by the ADCLS 50 may alternately include one or more additional steps that terminate the methodology under some circumstances. For illustrative purposes, the logic begins in block 52 and progresses to block 54 where a target delta value ($\Delta_T$) for the opposing output shafts of each vehicle differential is determined. $\Delta_T$ is a shaft speed difference value measured for each vehicle differential; 14, 24 and 38, while the vehicle 10 is traveling in a straight line or turning on a non-slip surface. Alternatively, if $\Delta_T$ values are not measured, they are utilized from logic memory. However, it is advantageous to measure $\Delta_T$ values because the mechanical parts involved in the $\Delta_T$ measurements are subject to continual wear, thus deviating from a theoretical $\Delta_T$ value. $\Delta_T$ has a tolerance range about its value to account for any real world differences between the output shaft speeds of the differential under measurement. The tolerance range accounts for the potential variances mentioned above, including tire wear, gear wear, bearing wear, and other factors which might cause unequal differential shaft speeds. These measurements can be taken at any of the vehicle wheels or differential output shafts.

Figure 4:
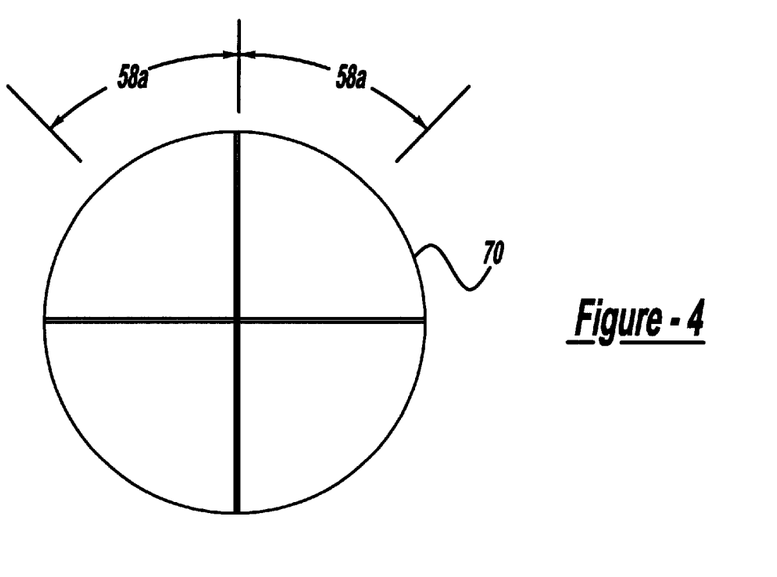
FIG. 4 is a front view of a steering wheel showing representative steering wheel angles.
Figure 5:
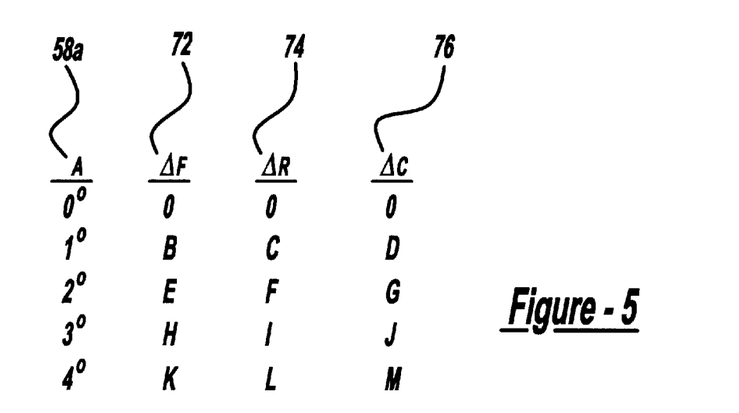
FIG. 5 is a table showing steering wheel angles and representative corresponding $\Delta_T$ value corrections for the front, rear, and center differentials.

The ADCLS 50 then progresses to block 56 where $\Delta_A$ values are calculated using the actual speeds of the given output shafts, $\omega_a$ and $\omega_b$, for a given differential. For instance, values for $\Delta_A$ may be measured for output shafts 16 and 18 of differential 14, output shafts 26 and 28 of differential 24, and output shafts 34 and 36 of differential 38. The ADCLS 50 then proceeds to block 58 where the steering wheel angle 58a is measured. The ADCLS 50 accounts for the steering wheel angle 58a of steering wheel 70 of FIG. 4 according to the representative table depicted in FIG. 5. FIG. 5 depicts a representative table of calculated target differential values B-M based on the steering wheel angle 58a. The values B-M are necessary for each differential of each vehicle to compensate for the wheel speed mismatch caused by the steering wheel angle 58a since one output shaft spins slower than its differential counterpart when a vehicle negotiates a turn. A correction for the output shaft speed mismatch is necessary so that the ADCLS 50 does not attempt to transfer torque to an output shaft spinning slower than its differential counterpart when there is no actual wheel slip but only a turn of the steering wheel. In the table of FIG. 5, steering wheel angle 58a is the independent variable because it changes at any given moment during vehicle operation according to a driver's desire. Three variables depend upon the steering wheel angle 58a; one front variable 72 for the front differential 14, one rear variable 74 for the rear differential 24, and one center variable 76 for the center differential 38.

The logic loop then proceeds to decision block 60 where the ADCLS 50 determines if the steering wheel angle (A) is greater than a threshold value. Theoretically, the threshold value is zero, when the steering wheel is not being turned, but it may be a non-zero number depending upon the vehicle's mechanical condition or simply the design of the vehicle. If the steering wheel angle (A) is greater than a threshold value, then the ADCLS 50 proceeds to block 62 where compensation is made to $\Delta_T$ because of the steering wheel angle (A). The logic loop then proceeds to decision block 64. However, if the steering wheel angle (A) is not greater than a threshold value, then no compensation for the steering wheel angle (A) is made to $\Delta_T$ and the system proceeds to decision block 64. When compensation is made to $\Delta_T$ of a given differential because of a steering wheel angle, the $\Delta_T$ becomes a non-zero number.

Normally, if the $\Delta_A$ value for a differential falls within a predetermined $\Delta_T$ tolerance range, then there is no appreciable output shaft speed difference for that differential and the ADCLS 50 proceeds through continuation block 68 to starting block 52 without altering the distribution of torque across the differential. However, in the event the $\Delta_A$ value is outside of a $\Delta_T$ tolerance range then the ADCLS 50 proceeds to block 66 and reacts by adjusting the torque within the subject differential to make $\Delta_A$ equal $\Delta_T$. The ADCLS 50 then proceeds to start block 52 and begins another cycle.

If a transfer of torque within a differential is necessary, it is accomplished by one of several methods or by a combination of methods. For instance, with reference to FIG. 2a, torque transfer occurs by the actuation of a clutch pack 50j by an actuator 50l. Actuator 50l may be driven either hydraulically with a pump or electrically with a motor. The clutch pack 50j limits the slip across the differential 50k. The invocation of the clutch pack 50j begins when a first output shaft speed sensor 50h and a second output shaft speed sensor 50i determine the speeds of first output shaft 50f and second output shaft 50g, respectively, to determine an $\Delta_A$ of the ADCLS 50 as explained above.

In addition to an output shaft speed mismatch occurring during a normal turning of a vehicle, every vehicle differential experiences a normal delta ($\Delta_N$) between its output shafts, when the vehicle is not being turned, due to design and mechanical wear as explained above. The $\Delta_N$ across a differential becomes the $\Delta_T$ for that differential since the $\Delta_N$ is the difference experienced during normal vehicle operation on dry, non-slip pavement. In addition to measuring a $\Delta_T$ for a vehicle, a normalization of each vehicle $\Delta_T$ is necessary. The normalization of each $\Delta_T$ is necessary because the absolute value of the $\Delta_N$ increases in direct proportion to the differential output shaft speeds as vehicle speed increases. In order to account for the increase in $\Delta_N$, the value of $\Delta_T$ must be normalized to vehicle speed. This is done by expressing the $\Delta_T$ as a ratio of the absolute delta speed $(\omega_a-\omega_b)$ to the average speed $(\omega_a+\omega_b)/2$ where $\omega_a$ and $\omega_b$ are, representatively, the differential output shaft speeds of output shaft 16 and output shaft 18 of FIG. 2. Using this arrangement, the ADCLS 50 and accompanying internal differential clutch packs will not actuate which will not correct for normal speed differentiation as vehicle speed increases. Therefore, the $\Delta_N$ value becomes the $\Delta_T$ value to be used in comparisons.

The equation to arrive at an $\Delta_T$ for a given differential is:

$$\Delta_T 32 (\omega_a-\omega_b)/((\omega_a+\omega_b)/2)$$

where:

$\Delta_T$=target delta value for a given differential
$\omega_a$=speed of a first differential output shaft
$\omega_b$=speed of a second differential output shaft The equation to arrive at an $\Delta_A$ for a given differential is:

$$\Delta_A=(\omega_a-\omega_b)/((\omega_a+\omega_b)/2)$$

where:

$\Delta_A$ =actual delta value for a given differential
$\omega_a$=speed of a first differential output shaft
$\omega_b$=speed of a second differential output shaft The factor of 2 can be removed to simplify the expression, yielding:

$$\Delta_T=(\omega_a-\omega_b)/(\omega_a+\omega_b)$$

and $$\Delta_A=(\omega_a-\omega_b)/(\omega_a+\omega_b)$$

Additionally, to prevent the expression from approaching infinity at low speeds, a minimum value can be established for the denominator, such as the value corresponding to straight vehicle operation at 2 mph. Also, a tolerance range must be provided around $\Delta_T$ to provide for normal variation about the mean so that unnecessary torque transfers are not made during operation of a vehicle experiencing no wheel slip, but rather experiencing only normal speed differentiation as explained above.

As the ADCLS 50 proceeds through the logic loop of FIG. 3 as explained above, the $\Delta_A$ is compared to $\Delta_T$ and the system either reacts by transferring torque to the non-slipping wheel or the system does not react. When the ADCLS 50 is called upon to transfer torque, a control logic methodology is utilized. Those skilled in the art will realize that other control methods may be utilized. However, in order to limit the discussion, only three control logic methods are included in this discussion.

The $\Delta_T$ and $\Delta_A$ equations are utilized in each of three specific methods of control logic known as the proportional (P), integral (I), and differential (D) control logic methods. Each method has advantages and disadvantages associated with its use, so in addition to utilizing individual control logic methods, combinations utilizing a pair or all three of the methods may enhance the differential control effectiveness for a given slip situation. Present method combinations consist of 1) proportional (P), 2) proportional and integral (PI), 3) proportional and derivative (PD), and 4) proportional, integral and derivative (PID). However, any single use or combination of the equations is foreseeable.

Figure 6:
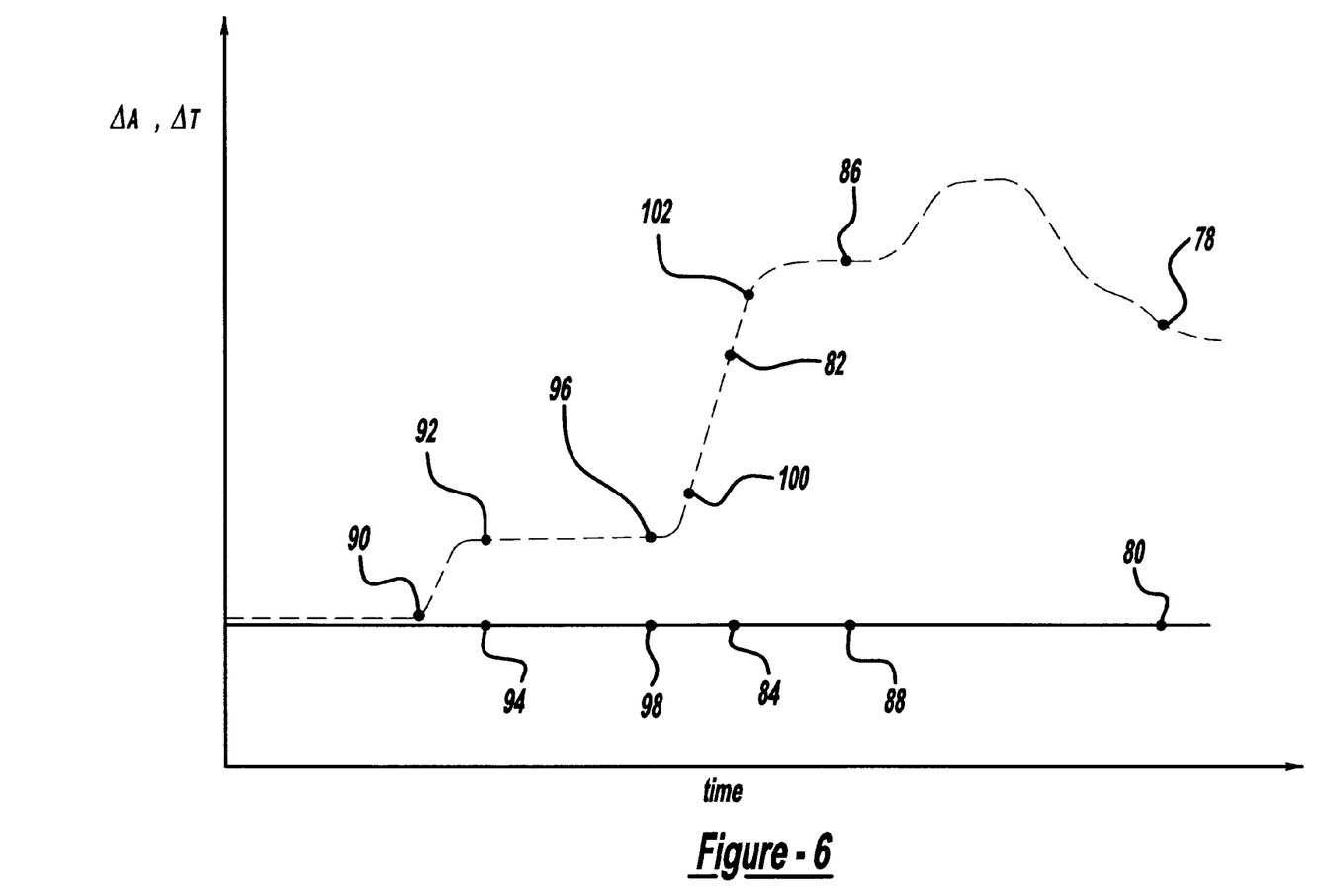
FIG. 6 is a representative plot showing "$\Delta_A$ and $\Delta_T$ versus time" for a given vehicle and terrain.

FIG. 6 is a representative plot showing "$\Delta_A$ and $\Delta_T$ versus time" for a given differential on a given vehicle traversing a given terrain and exemplifies the PID methods of control and how each relates to the values of $\Delta_T$ and $\Delta_A$ over time. During the operation of a vehicle on dry pavement or other surface providing complete traction to the wheels, the plots of $\Delta_A$ 78 and $\Delta_T$ 80 will theoretically coincide on the plot of FIG. 6. The values of $\Delta_A$ 78 and $\Delta_T$ 80 also coincide for a vehicle turning on dry pavement due to the steering wheel angle correction factors 72, 74 and 76 for the representative steering wheel angles 58a noted in FIG. 5. Correction factors B-M for steering wheel angles 58a that are not whole numbers may be interpolated or mathematically calculated. When wheel slip at any of the four wheels 20, 22, 30 or 32 of FIG. 2 occurs, $\Delta_A$ varies from $\Delta_T$ and the plot of FIG. 6 will no longer exhibit coincident values of $\Delta_A$ and $\Delta_T$ unless the wheel slip ends. To better explain the plots of FIG. 6 and the particular uses of the PID control methodologies, the equations used within the PID control methodologies will be described in greater detail.

The proportional method of logic control utilizes the term:

$$(\Delta_{A-\Delta T})$$

and provides for a basic torque correction. For instance, the proportional control logic method evaluates the difference between the values of $\Delta_A$ 82 and $\Delta_T$ 84 and makes a correction based solely on the difference between $\Delta_A$ and $\Delta_T$ for any specific points in time. So, as the difference grows between $\Delta_A$ and $\Delta_T$, the torque correction involves the invocation of a differential clutch pack in direct proportion to the $(\Delta_A-\Delta_T)$ difference. That is, as the difference between $\Delta_A$ and $\Delta_T$ grows, such as evidenced between $\Delta_A$ 86 and $\Delta_T$ 88, an increase in clutch pack force is necessary to limit the slip across the differential, and thereby to transfer torque to the non-slipping wheels. The clutch pack within each differential causes $\Delta_A$ to approach and become coincident with $\Delta_T$ to stop any wheel(s) from slipping.

The integral method of control utilizes the term:

$$\sum_{i=1}^{n}(\Delta_A-\Delta_T)_i$$

and makes corrections based on the accumulated error over time. This provides for a more accelerated response than a proportional response alone. The integral control method adds the area (error) between the $\Delta_A$ and $\Delta_T$ curves up to a particular point in time, points $\Delta_A$ 86 and $\Delta_T$ 88 for instance, from the onset of wheel slip as shown at position 90. So, when the area between the curves increases, the integral method takes into consideration the total or accumulated error over time and transfers torque as necessary to the non-slipping wheel(s).

Compared to the proportional method of control, the integral method of control responds more aggressively as time increases, given the same condition of wheel slip. For instance, if the $\Delta_A$ value is flat with time but is different than $\Delta_T$, that is, the $\Delta_A$ is not increasing but running parallel with $\Delta_T$, the absolute value of the error is not changing. The proportional method of logic control will respond, but a torque transfer may be inadequate and if the torque response is inadequate, the wheel slip condition will continue (even though the proportional method of control continues to respond). The same level of torque correction occurs because the difference between $\Delta_A$ and $\Delta_T$ is constant with time as evidenced between points $\Delta_A$ 92 and $\Delta_T$ 94 through points $\Delta_A$ 96 and $\Delta_T$ 98 of FIG. 6. However, as time goes on, the error accumulates causing the integral term to compound and provoke a more aggressive correction. Therefore, the integral method of logic control corrects for situations when the proportional logic control method alone may not be adequate or effective.

The third method of logic control is the derivative method of logic control which utilizes the term:

$$(\Delta_A-\Delta_T)_{i+1}-(\Delta_{A-\Delta T})_i$$

and makes corrections based on the rate of change of the error over time. This method of logic control provides for aggressive correction when the error is increasing very quickly such as can be seen between points $\Delta_A$ 100 and $\Delta_A$ 102 of FIG. 6.

While invoking the automatic four-wheel-drive system as quickly as possible is important, no particular method of logic control is faster at slip detection than another. That is, the system time response can be equally as fast using P, I or D control. An important consideration lies with which method or methods of logic control the ADCLS utilizes to be most advantageous.

The proportional method of logic control is a gain (G) times the error (E) in the system. If the gain and error in the system are high, quick logic control response occurs causing the engagement of a differential clutch pack within a specific differential. However, the response may be too aggressive, if the $(\Delta_A-\Delta_T)$ difference is too high, and may actually "overshoot" the $\Delta_T$ value and invoke a temporary cyclical response. Adding the integral method of control to the correction for a combined proportional-integral (PI) method of control, allows the system to decrease the gain (the proportional value) and retain the same system response time while adding the integral method of logic control to the system, resulting in a favorable, smoother response. The end result is a system that responds quickly to slip, but that reacts more smoothly than simply using a proportional response alone for the given wheel slip situation.

Furthermore, modifiers may be used to accommodate different vehicle operation environments. For example, if the vehicle transfer case is operating in low range, the logic system may deduce that the vehicle is operating off-road. Therefore, a significantly more aggressive control algorithm, better suited to off-road use, would greatly benefit the vehicle driver. This would automatically invoke a particular combination of the proportional, integral and derivative methods of logic control. However, using the same algorithm(s) on-road, may result in undesirable corrections and be disadvantageous for the given terrain or vehicle driver. The modifiers act to change the particular level of inclusion of each of the proportional, integral and derivative methods of logic control to allow the control system to react most appropriately for the given terrain.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling torque within a vehicle differential comprising the steps of:

providing a differential having first and second output shafts;

determining a first speed ($\omega_a$) of said first output shaft;

determining a second speed ($\omega_b$) of said second output shaft;

determining a target delta ($\Delta_T$) as a function of said first speed ($\omega_a$) of said first output shaft and said second speed ($\omega_b$) of said second output shaft under preselected vehicle operating conditions;

determining an actual delta ($\Delta_A$) as a function of said first speed ($\omega_a$) of said first output shaft and said second speed ($\omega_b$) of said second output shaft under actual vehicle operating conditions;

determining a control value (CV) as a function of said actual delta ($\Delta_A$) and said target delta ($\Delta_T$); and comparing said control value (CV) to said target delta ($\Delta_T$).

2. The method of claim 1 further comprising the step of controlling said first output shaft and said second output shaft such that $\Delta_A$ is equal to $\Delta_T$ within a predetermined range.

3. The method of claim 1 wherein said preselected vehicle operating conditions comprises the vehicle being operated on a non-slip surface in a straight line.

4. The method of claim 1 further comprising the steps of measuring a steering wheel angle and allowing for a speed mismatch between said first output shaft and said second output shaft based upon said steering wheel angle.

5. The method of claim 1 further comprising the step of controlling the differential by transferring torque to one of said first output or said second output shafts when said control value (CV) is outside a target delta range.

6. The method of claim 5 wherein a PID feedback controller is employed in said controlling step.

7. The method of claim 1 further comprising the step of determining a steering wheel angle of the vehicle.

8. The method of claim 7 further comprising the step of controlling the differential by transferring torque to one of said first output or said second output shafts when said control value (CV) is outside a target delta range.

9. A method of allocating torque between output shafts of a vehicle differential comprising:

provide a differential;

providing a first output shaft on a first side of said differential;

providing a second output shaft on a second side of said differential;

determining a first speed ($\omega_a$) of said first output shaft;

determining a second speed ($\omega_b$) of said second output shaft;

determining a target delta ($\Delta_T$) as a function of said first speed ($\omega_a$) of said first output shaft and said second speed ($\omega_b$) of said second output shaft under preselected vehicle operating conditions;

determining an actual delta ($\Delta_A$) as a function of said first speed ($\omega_a$) of said first output shaft and said second speed ($\omega_b$) of said second output shaft under actual vehicle operating conditions;

determining a tolerance range about said target delta ($\Delta_T$); and controlling said first output shaft and said second output shaft of said differential using a method of control logic.

10. The method of claim 9 further comprising transferring torque to a non-slipping wheel when said actual delta ($\Delta_A$) is outside of said tolerance range.

11. The method of claim 9 further comprising the step of, determining a steering wheel angle of the vehicle.

12. The method of claim 11 further comprising the step of determining a differential correction factor for the differential based upon said steering wheel angle.

13. The method of claim 12 further comprising the step of transferring torque to a non-slipping wheel when said actual delta ($\Delta_A$) is outside of said tolerance range.

14. The method of claim 9 wherein said method of logic control comprises utilizing a proportional method of logic control.

15. The method of claim 14 wherein said method of logic control further comprises combining said proportional method of control logic with an integral method of logic control.

16. The method of claim 15 wherein said method of logic control further comprises combining said proportional method of logic control and said integral method of logic control with a derivative method of logic control.

17. The method of claim 16 further comprising the step of transferring torque to a non-slipping wheel when said actual delta ($\Delta_A$) is outside of said tolerance range.

18. A vehicle comprising:

a differential having a first output shaft and a second output shaft;

a control system for controlling said differential, said control system comprising a plurality of speed sensors and a controller;

a torque distributing means coupled to said differential and said control system, said torque distributing means being operable for controlling a ratio of torque between said first output shaft and said second output shaft wherein said control system compares an actual difference between said first output shaft and said second output shaft then compares it to an acceptable range, said acceptable range and said actual difference being normalized to vehicle speed.

19. The method of claim 1 wherein said preselected vehicle operating conditions comprises turning the vehicle on a non-slip surface.

20. The method of claim 9 wherein said preselected vehicle operating conditions comprises one of operating the vehicle on a non-slip surface in a straight line and turning the vehicle on a non-slip surface.

* * * * *